(12) United States Patent
Steklenski

(10) Patent No.: US 6,455,843 B1
(45) Date of Patent: Sep. 24, 2002

(54) ALIGNMENT FIXTURE FOR IMAGE QUALITY TEST TARGET

(75) Inventor: David J. Steklenski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 35 days.

(21) Appl. No.: 09/699,886

(22) Filed: Oct. 30, 2000

(51) Int. Cl.[7] .................................................. H01J 5/02

(52) U.S. Cl. ..................................... 250/239; 250/484.4

(58) Field of Search ............................. 250/239, 208.1, 250/484.4, 484.3, 475.2, 485.1, 486.1; 378/182, 169, 170, 172, 173, 177; 382/128, 133

(56) References Cited

U.S. PATENT DOCUMENTS 5,712,486 A * 1/1998 Soltani et al. ........... 250/484.4

* cited by examiner

Primary Examiner—Que T. Le
(74) Attorney, Agent, or Firm—William F. Noval

(57) ABSTRACT

A storage phosphor based computed radiography system apparatus for aligning a test target with storage phosphor assemblies of different sizes comprising; a rectangular tray for selectively holding at least a first storage phosphor assembly having a first rectangular size and a second storage phosphor assembly having a second rectangular size smaller than said first rectangular size; said tray having first and second nested receptacles for selectively holding said first or said second storage phosphor assembly and wherein said first receptacle is sized to hold a test target of said first rectangular size in alignment with a held storage phosphor assembly.

5 Claims, 4 Drawing Sheets

ALIGNMENT FIXTURE FOR IMAGE QUALITY TEST TARGET

FIELD OF THE INVENTION

This invention relates in general to storage phosphor based computed radiography and more particularly to a fixture for aligning an image quality test target with storage phosphors of different sizes.

BACKGROUND OF THE INVENTION

Storage phosphor based computed radiography (CR) systems use a storage phosphor screen to record a latent radiographic image of an object, such as a body part. The latent radiographic image is read out by a CR reader to produce a digital radiographic image which can be processed, stored, displayed or printed on print media. The storage phosphor screen can be contained in a cassette for ease of handling and protection. The Kodak Computed Radiography system uses a storage phosphor screen mounted on a rigid plate which is removably attached to a cassette. The cassette is mounted to a CR reader which detaches the storage phosphor screen from the cassette and processes the detached storage phosphor. Other CR systems use a flexible storage phosphor screen mounted in a conventional radiographic film cassette. Different storage phosphor screens are used for different radiographic needs. The Kodak CR system uses three different sized storage phosphor screens and cassettes 35 cm×43 cm, 24 cm×30 cm, and 18 cm×24 cm.

The ability to obtain high quality measurements for the testing and calibration of computed radiography equipment and the associated radiation storage panels is critical to providing assurance that the imaging capabilities of the system are within specifications. The ability to do this quickly and accurately is also of great importance both in the equipment production environment and in clinical practice. A new test target has been devised, U.S. patent application Ser. No. 09/525,089, filed Mar. 14, 2000, inventors Wang et al. which consists of a copper plate into which has been cut a pattern of squares. The target and associated software are used in the calibration of reading devices and in the testing of the three sizes of cassettes. In order for the test system to work, the target must be centered on the cassette with a high degree of accuracy and when a number of cassettes are to be tested, the repeatability of the target alignment can be critical to obtaining useful results. Alignment to the largest cassette to be tested can be simplified by making the target to the same size as the outer dimensions of the largest cassette. Alignment to smaller sizes can be very difficult as the cassettes are not easily visible under the target.

SUMMARY OF THE INVENTION

According to the present invention, there is provided a solution to the problems discussed above.

According to a feature of the present invention, there is provided a storage phosphor based computed radiography system apparatus for aligning a test target with storage phosphor assemblies of different sizes comprising; a rectangular tray for selectively holding at least a first storage phosphor assembly having a first rectangular size and a second storage phosphor assembly having a second rectangular size smaller than said first rectangular size; said tray having first and second nested receptacles for selectively holding said first or said second storage phosphor assembly and wherein said first receptacle is sized to hold a test target of said first rectangular size in alignment with a held storage phosphor assembly.

ADVANTAGEOUS EFFECT OF THE INVENTION

The invention has the following advantages.

1. Rapid, precise and simple alignment of a test target with multiple sizes of storage phosphor cassettes is obtained in a storage phosphor based CR system.
2. A test target alignment tray is provided which also stores and protects the test target.
3. A test target alignment tray is provided which is easily and inexpensively fabricated through vacuum or thermoforming of polymeric material.

DETAILED DESCRIPTION OF THE INVENTION

Figure 1:
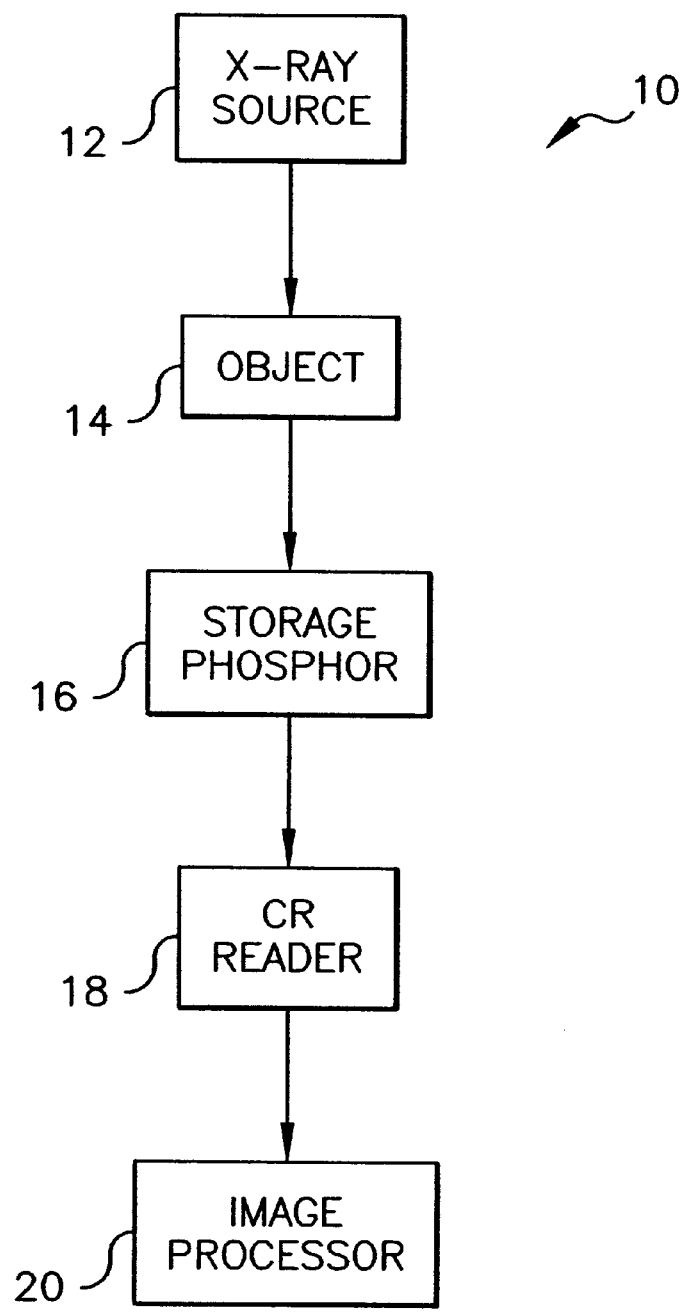
FIG. 1 is a block diagram of an exemplary storage phosphor based CR imaging system.

The present invention will be described as used in a storage phosphor based CR imaging system. An exemplary system is shown in FIG. 1 as shown System 10 includes an x-ray source 12 which projects x-rays through an object 14 (such as an individual's body part) to produce a radiographic image of the object which is recorded as a latent image in storage phosphor 16. The recorded radiographic image is read out by CR reader 18 to produce digital radiographic image which is processed by image processor 20 (e.g., a digital computer). The processed digital radiographic image can be stored in memory, displayed on an electronic display, transmitted to a remote location, printed out as a hard copy (film), etc.

Figure 2A:
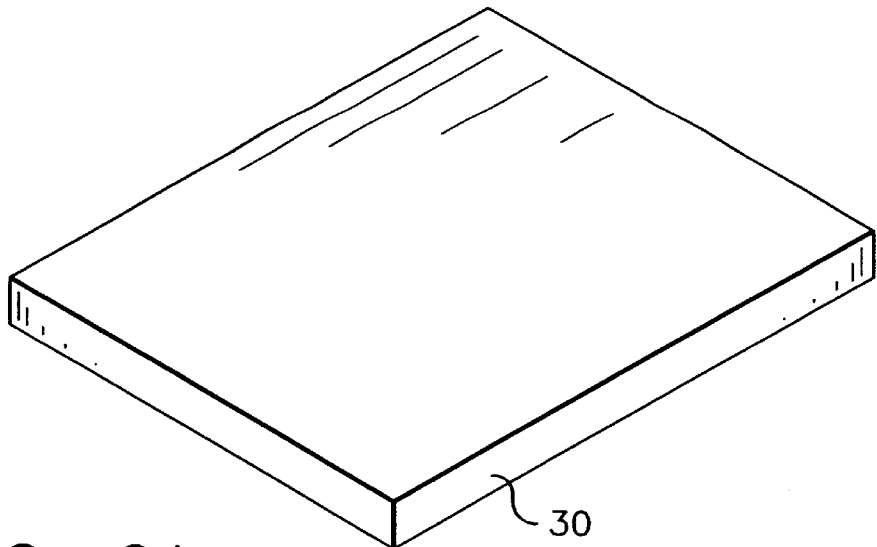
FIGS. 2A–2C are diagrammatic views of different sized storage phosphor cassettes which can be used with the present invention.
Figure 2B:
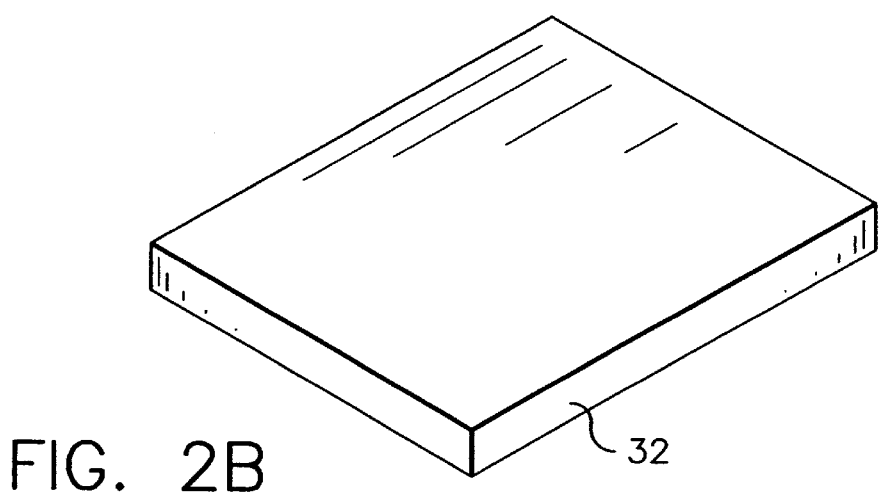
Figure 2C:
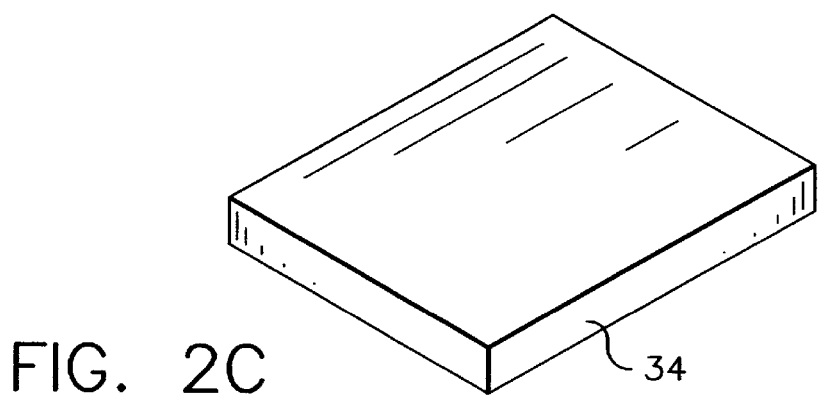

A number of different sized cassettes can be used with system 10 (as shown in FIGS. 2A–2C). Typical cassettes 30, 32, 34 respectively hold storage phosphor sizes of 35 cm×43 cm, 24 cm×30 cm, and 18 cm×24 cm. Other size storage phosphor cassettes can also be used.

Figure 3:
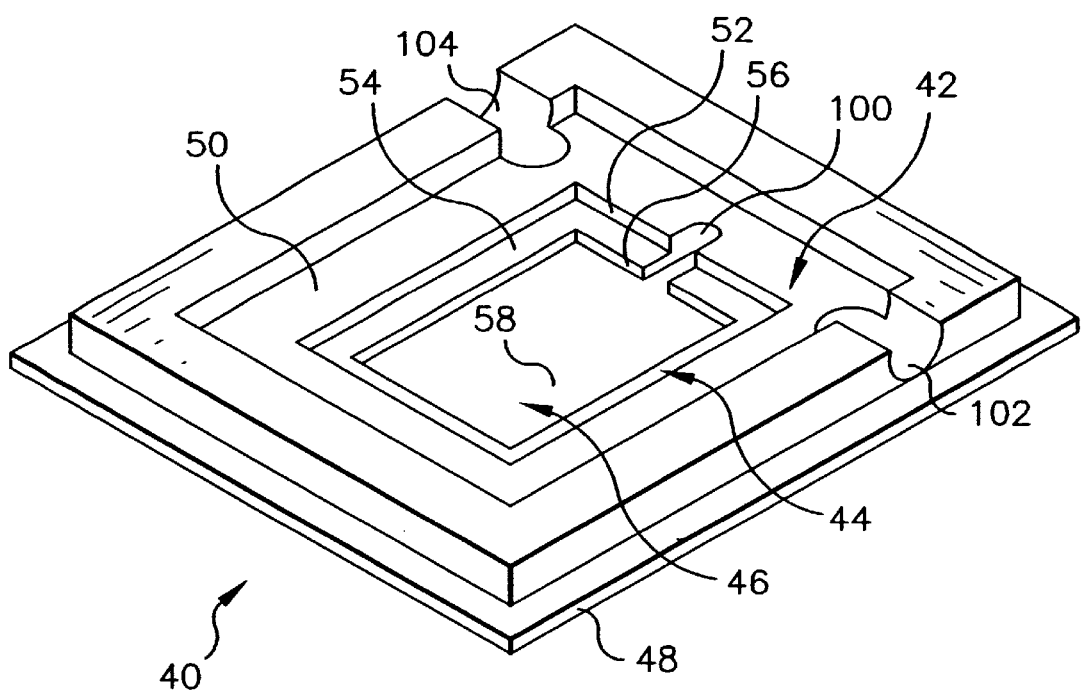
FIG. 3 is a perspective view of an embodiment of the present invention.

Referring now to FIG. 3, there is shown an embodiment of the present invention. As shown, tray 40 is preferably of a unitary construction of a light-weight polymer that can be thermo or vacuum molded. Tray 40 includes first, second and third nested receptacles 42, 44, 46 for selectively holding storage phosphor assemblies or cassettes of different sizes, such as cassettes 30, 32, 34 shown in FIGS. 2A, 2B, 2C respectively. Receptacle 42 includes rectangular wall 48 and rectangular ledge 50 sized to hold cassette 30. Receptacle 44 is nested in receptacle 42 which includes recessed wall 52 and recessed ledge 54. Receptacle 44 is sized to hold cassette 32. Nested within receptacle 44 is receptacle 46 including recessed wall 56 and bottom wall 58 for holding cassette 34. Slots 100, 102, 104 are provided to facilitate removal of a cassette from tray 40.

It will be understood that tray 40 can be formed of other materials such as metal, have other shapes, such as circular, can have fewer or more receptacles than three, can have different sized receptacles, etc.

Figure 4:
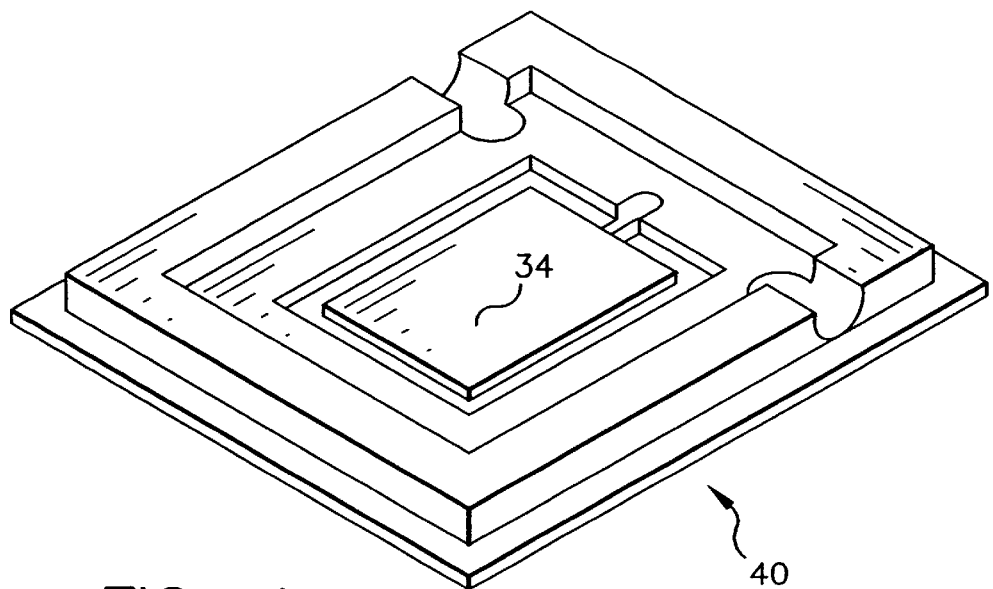
FIG. 4 is a perspective view of the embodiment of FIG. 3 holding a storage phosphor cassette.
Figure 5:
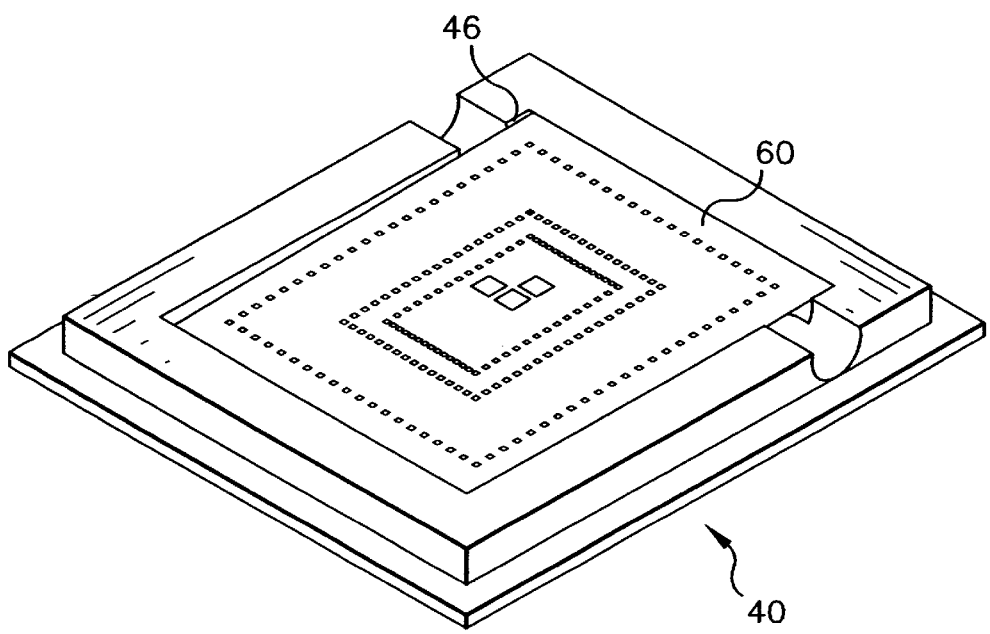
FIG. 5 is a perspective view of the embodiment of FIG. 3 holding an exemplary test target.

Referring to FIG. 4 there is shown tray 40 holding the smallest cassette 34 in receptacle 46. FIG. 5 shows a test target 60 nested in receptacle 42 over one of cassettes 30, 32, 34.

Target 60 is preferably that described in U.S. patent application Ser. No. 09/525,089, filed Mar. 14, 2000, inventors Wang et al. the contents of which are hereby incorporated by reference.

This target is used in measuring characteristics of a digital radiography system. The target is formed of a substantially flat member of an x-ray attenuating material and includes various arrays of landmarks, sets of regions and sharp angular edges for use respectively in geometry measurements, exposure linearity accuracy, noise measurement and modulation transfer functions.

The tray allows rapid, precise and simple alignment of the test target with multiple sizes of cassettes and also functions to hold and protect the target for storage. The design is easily and inexpensively fabricated through vacuum or thermoforming.

Although preferred embodiments are described herein, it will be understood that modifications and equivalents thereof are deemed to be within the scope of the invention.

The invention has been described in detail with particular reference to certain preferred embodiments thereof, but it will be understood that variations and modifications can be effected within the spirit and scope of the invention.

PARTS LIST

10 system
12 x-ray source
14 object (human body part)
16 storage phosphor
18 CR reader
20 image processor
30,32,34 cassettes
40 tray
42,44,46 nested receptacles
48 rectangular wall
50 rectangular ledge
52 recessed wall
54 recessed ledge
56 recessed wall
58 bottom wall
60 target
102,102,104 slots

What is claimed is:

1. A storage phosphor based computed radiography system apparatus for aligning a test target with storage phosphor assemblies of different sizes comprising;

a rectangular tray for selectively holding at least a first storage phosphor assembly having a first rectangular size and a second storage phosphor assembly having a second rectangular size smaller than said first rectangular size;

said tray having first and second nested receptacles for selectively holding said first or said second storage phosphor assembly and wherein said first receptacle is sized to hold a test target of said first rectangular size in alignment with a held storage phosphor assembly.

2. The apparatus of claim 1 wherein said tray selectively holds a third storage phosphor assembly of a third rectangular size smaller than said second rectangular size; and wherein said tray has a third nested receptacle within said second receptacle for selectively holding said third storage phosphor assembly.

3. The apparatus of claim 1 wherein said tray includes channels communicating with said receptacles to permit insertion of a tool or finger to facilitate insertion or removal of a test target or storage phosphor assembly relative to said tray.

4. The apparatus of claim 1 wherein said tray is formed of a unitary polymeric material.

5. The apparatus of claim 1 wherein said tray is thermo or vacuum formed.

* * * * *